(12) United States Patent
Kling

(10) Patent No.: US 11,519,291 B2
(45) Date of Patent: Dec. 6, 2022

(54) INTEGRAL STIFFENING RAIL FOR BRAIDED COMPOSITE GAS TURBINE ENGINE COMPONENT

(71) Applicant: United Technologies Corporation, Farmington, CT (US)

(72) Inventor: Colin J. Kling, Glastonbury, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 289 days.

(21) Appl. No.: 15/868,289

(22) Filed: Jan. 11, 2018

(65) Prior Publication Data

US 2019/0211705 A1 Jul. 11, 2019

(51) Int. Cl.
| | | |
|---|---|---|
| F01D 21/04 | (2006.01) | |
| F01D 25/24 | (2006.01) | |
| B32B 3/08 | (2006.01) | |
| B32B 1/08 | (2006.01) | |
| B32B 3/28 | (2006.01) | |
| B32B 5/26 | (2006.01) | |
| B29C 70/24 | (2006.01) | |
| B29C 70/22 | (2006.01) | |
| B29D 99/00 | (2010.01) | |
| B29C 70/70 | (2006.01) | |

(Continued)

(52) U.S. Cl.
CPC .......... *F01D 21/045* (2013.01); *B29C 70/228* (2013.01); *B29C 70/24* (2013.01); *B29C 70/70* (2013.01); *B29D 99/0014* (2013.01); *B32B 1/08* (2013.01); *B32B 3/08* (2013.01); *B32B 3/28* (2013.01); *B32B 5/26* (2013.01); *F01D 25/24* (2013.01); *B29C 70/72* (2013.01); *B32B 2260/021* (2013.01); *F05D 2220/32* (2013.01); *F05D 2220/36* (2013.01); *F05D 2300/603* (2013.01); *F05D 2300/6034* (2013.01)

(58) Field of Classification Search
CPC ........ F01D 21/045; F01D 25/24; B32B 3/28; B32B 5/26
See application file for complete search history.

(56) References Cited

U.S. PATENT DOCUMENTS

| | | |
|---|---|---|
| 6,187,411 B1 | 2/2001 | Palmer |
| 8,636,252 B2 | 1/2014 | Pook et al. |

(Continued)

FOREIGN PATENT DOCUMENTS

| | | |
|---|---|---|
| EP | 2290197 A2 | 3/2011 |
| EP | 3192979 A1 | 7/2017 |
| WO | 2014151097 A1 | 9/2014 |

OTHER PUBLICATIONS

Extended European Search Report for EP Application No. 19151453.8, dated Jun. 19, 2019, pp. 1-6.

*Primary Examiner* — Courtney D Heinle
*Assistant Examiner* — Michael K. Reitz
(74) *Attorney, Agent, or Firm* — Cantor Colburn LLP

(57) ABSTRACT

A gas turbine engine component includes a tubular body section including a plurality of fiber wraps encompassed within a matrix composition and one or more integrally-formed stiffeners extending from an outer surface of the body section and in a component circumferential direction around the body section. The stiffener includes one or more fiber wraps extending radially outwardly from the body section over a form and to the body section from the form.

7 Claims, 5 Drawing Sheets

(51) Int. Cl.
    *D04C 1/06*     (2006.01)
    *B29C 70/72*     (2006.01)

(56) References Cited

U.S. PATENT DOCUMENTS

| | | |
|---|---|---|
| 8,757,958 B2 | 6/2014 | Lussier |
| 8,918,970 B2 | 12/2014 | Hayse |
| 9,180,960 B2 | 11/2015 | Rosman |
| 9,440,402 B2 | 9/2016 | Pook et al. |
| 9,623,610 B2 | 4/2017 | Ashton et al. |
| 2004/0146393 A1* | 7/2004 | Evans .................. F01D 21/045 |
| | | 415/9 |
| 2014/0079895 A1 | 3/2014 | Foster et al. |
| 2016/0024969 A1 | 1/2016 | Foster et al. |
| 2016/0032776 A1 | 2/2016 | Voleti et al. |
| 2016/0221271 A1* | 8/2016 | Yarker .................. B29C 70/38 |

\* cited by examiner

INTEGRAL STIFFENING RAIL FOR BRAIDED COMPOSITE GAS TURBINE ENGINE COMPONENT

BACKGROUND

Exemplary embodiments pertain to the art of gas turbine engines, and more particularly relate to braided composite components, such as fan containment cases for gas turbine engines.

Gas turbine engines typically include a fan section, enclosed in a fan containment case. The fan containment case functions to direct airflow through the fan section, and is also configured to contain fan components such as fan blades, in the event of a fan blade out (FBO) event or other incident. Present fan containment case configurations are formed from a braided carbon fiber and epoxy composite construction, and utilize a hardwall containment system of a cured carbon fiber/Kevlar laminate to contain a fractured fan blade and minimize FBO deflections within newer, streamlined nacelles. The braided carbon fiber material has greater structural capability relative to more traditional fabrics or unidirectional composites at similar laminate thicknesses. This allows for the potential thinning of the composite fan containment case for weight optimization, resulting in a lighter design that is still capable of containing a fan blade out (FBO) event pursuant to FAR 33 requirements. As the braided design is scaled up to larger fan diameter applications with slower fan blade speeds (RPM), however, the challenge to the fan containment case from an FBO standpoint may become less of a concern due at least in part to the lower fan rotational speed. The limiting design consideration may become the droop and ovalization of the fan case under its own weight, and the potential effects on rubstrip clearances, which impacts fan efficiency.

One approach to address the potential ovalization is to thicken the fan containment case shell. However, this may not be the most weight efficient design solution.

BRIEF DESCRIPTION

In one embodiment, a gas turbine engine component includes a tubular body section including a plurality of fiber wraps encompassed within a matrix composition and one or more integrally-formed stiffeners extending from an outer surface of the body section and in a component circumferential direction around the body section. The stiffener includes one or more fiber wraps extending radially outwardly from the body section over a form and to the body section from the form.

Additionally or alternatively, in this or other embodiments the fiber wraps each include a plurality of axial tows oriented to extend in the component circumferential direction, and a plurality of first bias tows and a plurality of second bias tows braided with the plurality of axial tows.

Additionally or alternatively, in this or other embodiments the plurality of axial tows are discontinuous along a circumferential length of the stiffener.

Additionally or alternatively, in this or other embodiments the form is one of a flyaway mandrel or a filler element.

Additionally or alternatively, in this or other embodiments the filler element is formed from one of a potting compound or a foam material.

Additionally or alternatively, in this or other embodiments the filler element is hollow.

Additionally or alternatively, in this or other embodiments one or more vent openings extend into the filler element to reduce a pressure differential between ambient conditions and an interior of the filler element.

Additionally or alternatively, in this or other embodiments the stiffener has a rounded triangular cross-section.

In another embodiment, a fan containment case for a gas turbine engine includes a tubular body section including a plurality of fiber wraps encompassed within a matrix composition. The plurality of fiber wraps each include a plurality of axial tows oriented to extend in the component circumferential direction, and a plurality of first bias tows and a plurality of second bias tows braided with the plurality of axial tows. One or more integrally-formed stiffeners extend from an outer surface of the body section and in a component circumferential direction around the body section. The stiffener includes one or more fiber wraps extending radially outwardly from the body section over a filler element and to the body section from the filler element.

Additionally or alternatively, in this or other embodiments the plurality of axial tows are discontinuous along a circumferential length of the stiffener.

Additionally or alternatively, in this or other embodiments the filler element is formed from one of a potting compound or a foam material.

Additionally or alternatively, in this or other embodiments the filler element is hollow.

Additionally or alternatively, in this or other embodiments one or more vent openings extend into the filler element to reduce a pressure differential between ambient conditions and an interior of the filler element.

Additionally or alternatively, in this or other embodiments the stiffener has a rounded triangular cross-section.

In yet another embodiment, a gas turbine engine includes a turbine section and a fan section operably connected to the turbine section, the fan section including a fan and a fan containment case surrounding the fan. The fan containment case includes a tubular body section including a plurality of fiber wraps encompassed within a matrix composition. The plurality of fiber wraps each include a plurality of axial tows oriented to extend in the component circumferential direction and a plurality of first bias tows and a plurality of second bias tows braided with the plurality of axial tows. One or more integrally-formed stiffeners extend from an outer surface of the body section and in a component circumferential direction around the body section. The stiffener includes one or more fiber wraps extending radially outwardly from the body section over a filler element and to the body section from the filler element.

Additionally or alternatively, in this or other embodiments the plurality of axial tows are discontinuous along a circumferential length of the stiffener.

Additionally or alternatively, in this or other embodiments the filler element is formed from one of a potting compound or a foam material.

Additionally or alternatively, in this or other embodiments the filler element is hollow.

Additionally or alternatively, in this or other embodiments one or more vent openings extend into the filler element to reduce a pressure differential between ambient conditions and an interior of the filler element.

Additionally or alternatively, in this or other embodiments the stiffener has a rounded triangular cross-section.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
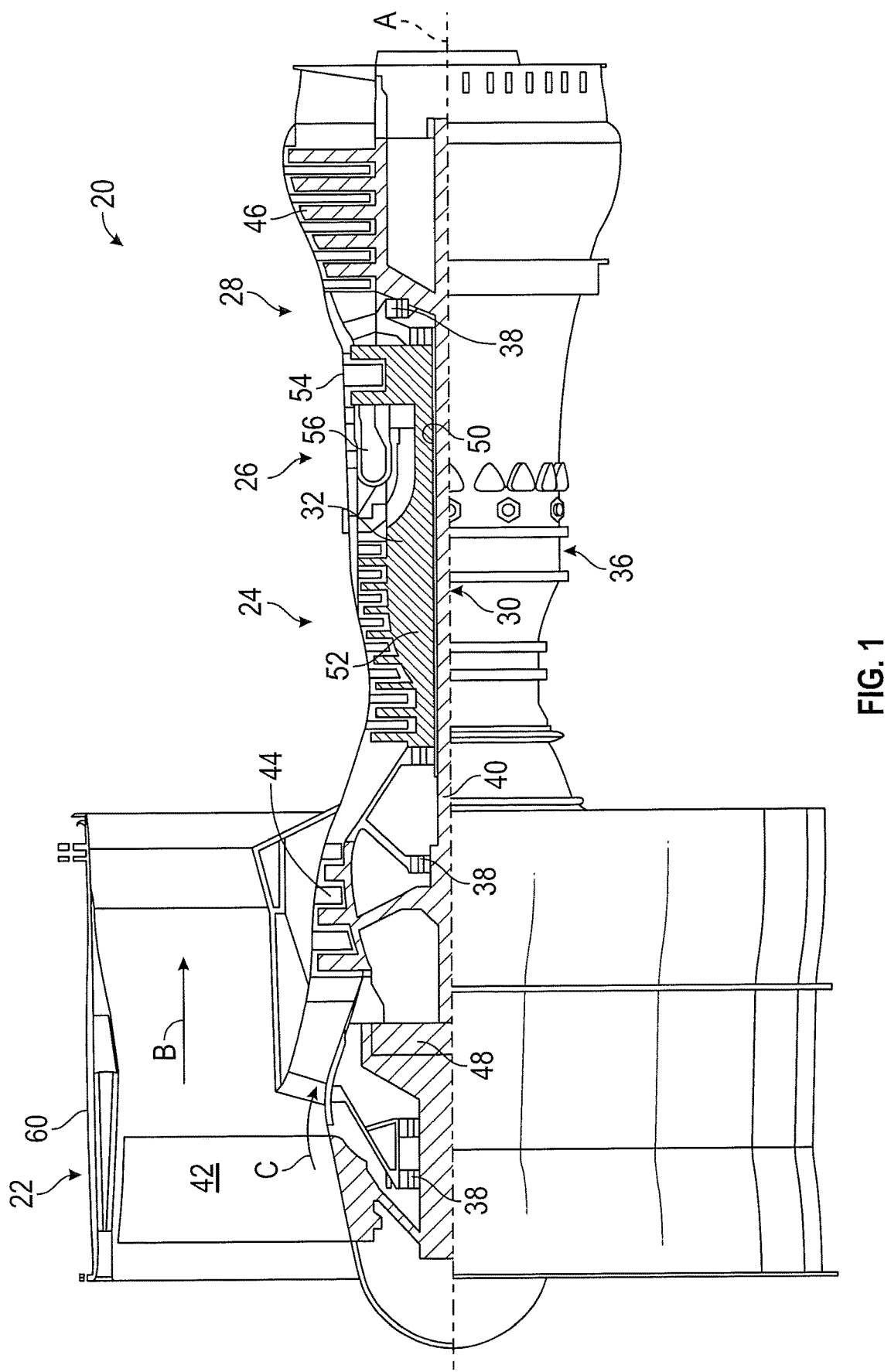
FIG. 1 is a cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R.})/(518.7° \text{ R.})]^{0.5}$. The "Low corrected fan tip speed" as disclosed herein according to one non-limiting embodiment is less than about 1150 ft/second (350.5 m/sec).

Figure 2:
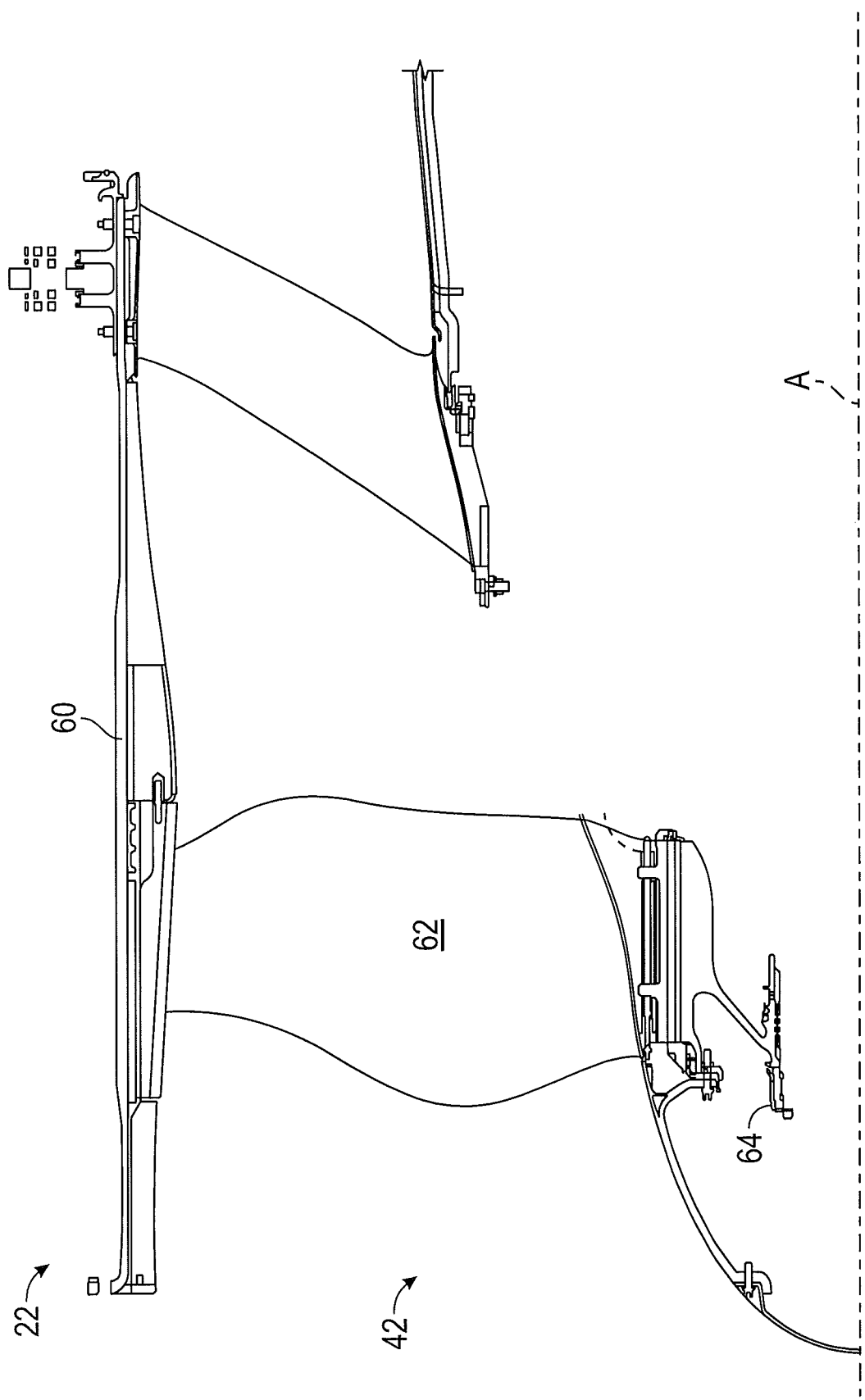
FIG. 2 is a partial cross-sectional view of an embodiment of a fan section for a gas turbine engine.
Figure 2A:
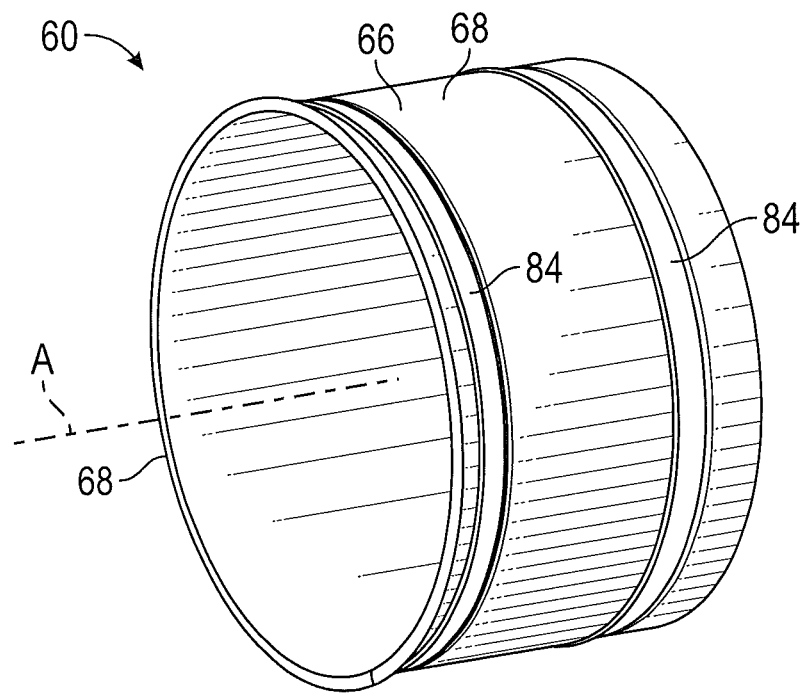
FIG. 2A is a perspective view of an embodiment of a fan containment case for a gas turbine engine.
Figure 2B:
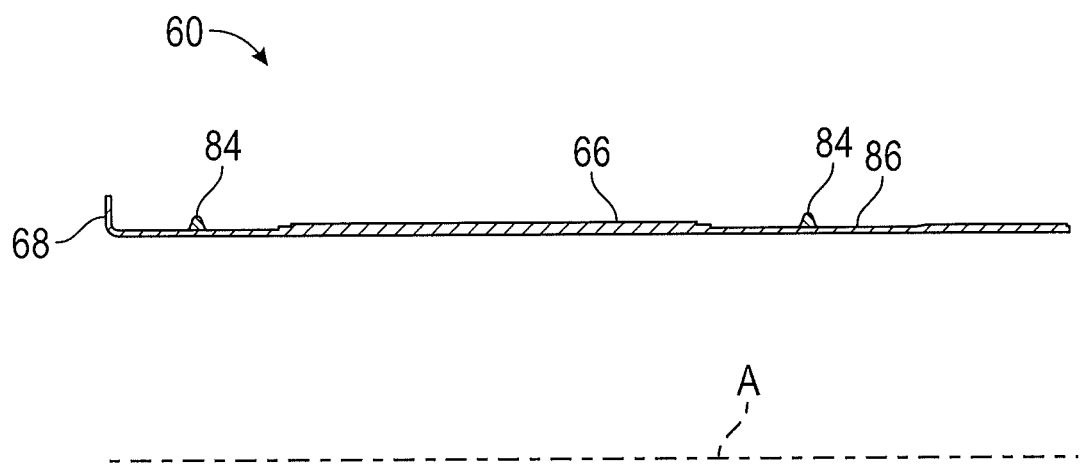
FIG. 2B is a profile view of an embodiment of a fan containment case for a gas turbine engine.

Referring now to FIG. 2, the fan section 22 includes a fan containment case 60 surrounding the fan 42, the fan 42 including a plurality of fan blades 62 extending from a rotor hub 64 located at the engine central longitudinal axis A. Referring also to FIGS. 2A and 2B, the fan containment case 60 includes a substantially cylindrical body section 66 and a flange section 68. Fan containment case 60 is formed from a composite material with a plurality of woven fibers encompassed within a matrix.

Figure 2C:
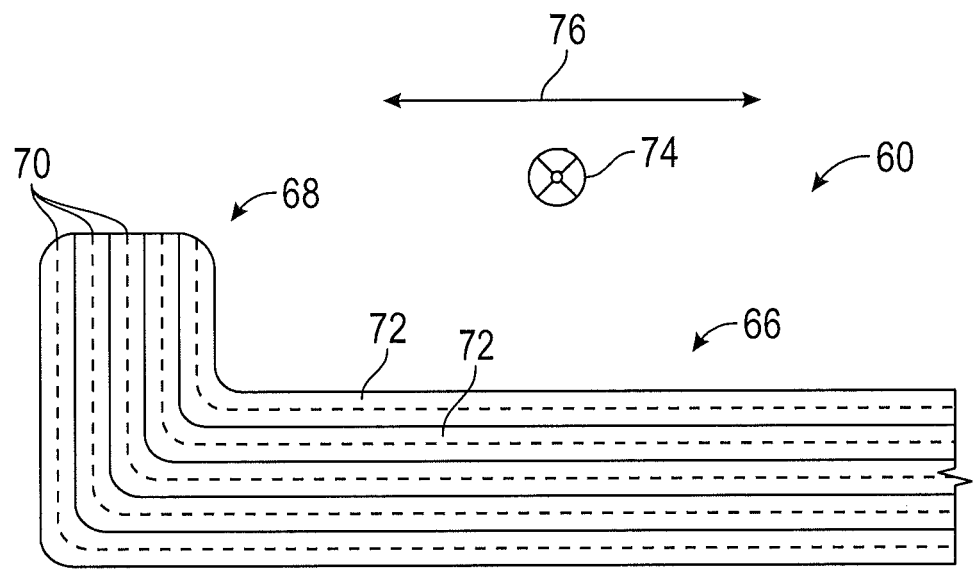
FIG. 2C is partial cross-sectional view of an embodiment of a fan containment case for a gas turbine engine.

Referring to FIG. 2C, fan containment case 60 includes a plurality of braided fiber wraps 70 encompassed within a cured matrix composition 72. Each braided fiber wrap 70 may be separate or they may be arrayed in a contiguous sheet. The woven fibers may be ceramic such as silicon carbide, or they may be carbon fibers. Additionally and/or alternatively, the woven fibers may include by way of non-limiting example, aramid (e.g. Kevlar®), fiberglass, polyethylene, etc. The fibers may be coated to improve adherence with the matrix, or they may be uncoated. The matrix may be ceramic, epoxy resin, or any other suitable material with appropriate mechanical characteristics.

Braided fiber wraps 70 can be aligned with its braided fibers or tows in order to customize mechanical properties of the fan containment case 60. There are some benefits to aligning axial tows (i.e., bundles of fibers arranged generally lengthwise along a fabric sheet) into a component circumferential direction 74. For example, this arrangement may increase hoop strength for larger components as compared to arranging the axial tows in a component axial direction 76. In this illustrative example, sufficient hoop strength allows a fan containment case 60 to absorb one or more fan blades 62 lost in, for example, a foreign object damage (FOD) event. The fan containment case 60 can then absorb blade off energy and maintain structural integrity.

Figure 3:
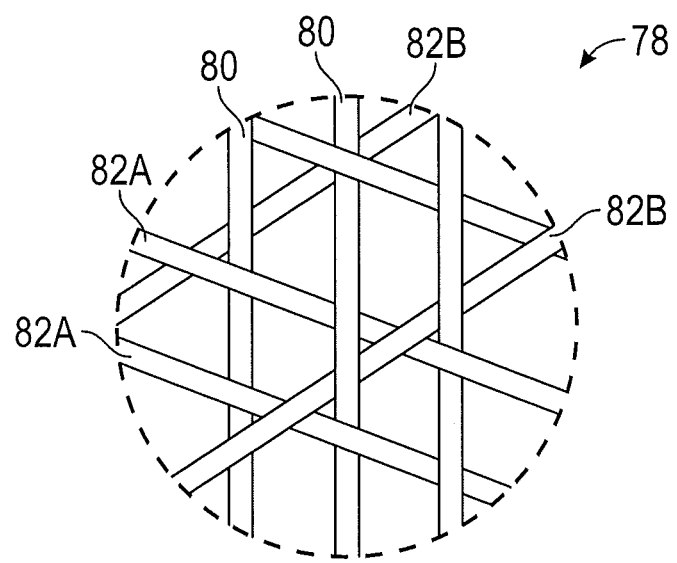
FIG. 3 is a plan view of an embodiment of a fiber tow configuration.

Referring to FIG. 3, and example of a braided tow arrangement 78 or fabric is illustrated. FIG. 3 illustrates a triaxial braided tow arrangement 78, with axial tows 80, first bias tows 82A and second bias tows 82B. Braided tow arrangement 78 is braided to have respective pluralities of first and second bias tows 82A, 82B, at about a 60° bias in either direction relative to axial tows 80. This arrangement is known as −60°/0°/60°. In this particular example of −60°/0°/60° triaxial tow arrangement 78 or fabric, each tow, or bundle of individual fibers, is approximately 60° offset from each adjacent tow when viewed normal to the sheet as in FIG. 3. Thus it will be apparent that, depending on sheet orientation, any plurality of parallel tows can be considered axial tow 80 and aligned with the component circumferential direction 74. It is to be appreciated that while a bias tows 82A and 82B having a 60° bias angle are shown in FIG. 3 and described herein, other bias angles, such as 45° may be utilized in other embodiments.

Referring again to FIGS. 2A and 2B, the fan containment case 60 includes one or more integral stiffeners 84 at an outboard surface 86 of the fan containment case 60. The integral stiffeners 84 extend in the component circumferential direction 74 about the fan containment case 60 and are positioned along the component axial direction 76 dependent on structural loads and areas of concern. In some embodiments, the stiffeners 84 extend continuously and unbroken around an entire circumference of the fan containment case 60, while in other embodiments, the stiffeners 84 may be segmented or discontinuous. Further, while two stiffeners 84 are illustrated in the FIGS. 2A and 2B, it is to be appreciated that in other embodiments, other quantities of stiffeners 84 such as 1, 3 or 4 stiffeners 84, may be utilized.

Figure 4:
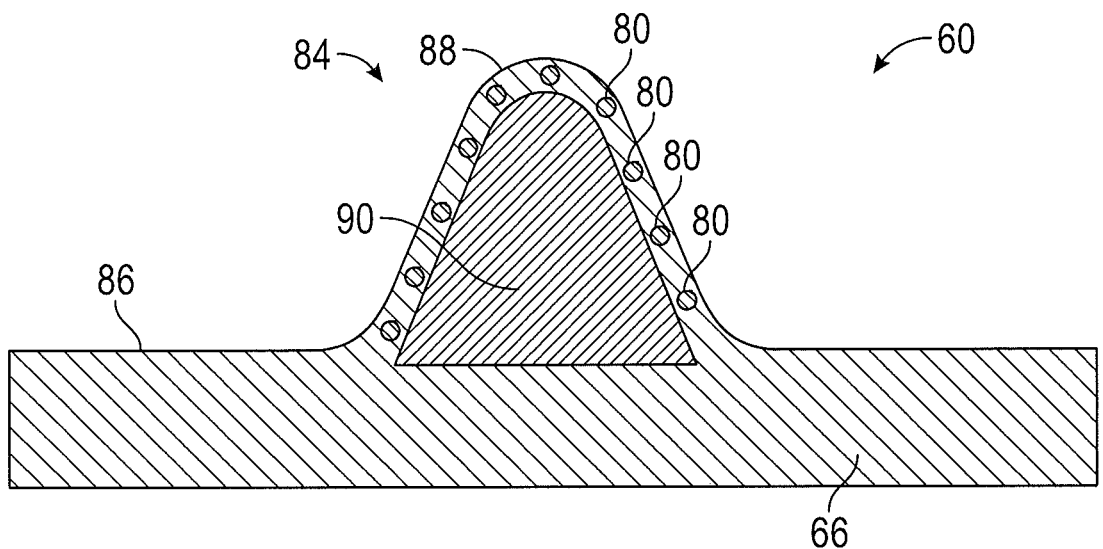
FIG. 4 is a cross-sectional view of an embodiment of an integrally-formed stiffener for a fan containment case.
Figure 5:
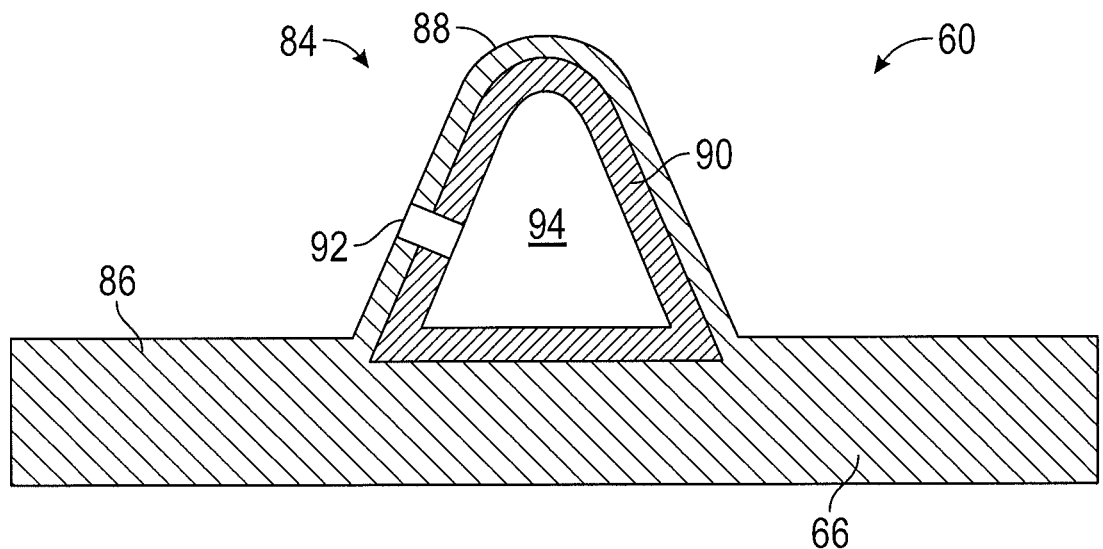
FIG. 5 is a cross-sectional view of another embodiment of an integrally-formed stiffener for a fan containment case.

An embodiment of stiffener 84 is shown in more detail in FIG. 4. The stiffener 84 is oriented out of plane to increase geometric stiffness of the fan containment case 60, and includes at least one layer of braided tow fabric 88 extending radially outwardly from the body section 66 of the fain containment case 60. The braided tow fabric 88 is formed over, for example, a flyaway mandrel or a filler element 90. A variety of materials may be utilized for the filler element 90 such as, for example, low density potting compound or foam. Low density and similar coefficient of thermal expansion (CTE) relative to the cured braided tow fabric 88 are desired, but not required. Further, the filler element 90 may be solid as illustrated in the embodiment of FIG. 4, or may alternatively have a hollow configuration as shown in FIG. 5, defining a filler element cavity 94 therein. If a hollow configuration is utilized, features such as vent holes 92 in the filler element 90 and the stiffener 84 are utilized to avoid a cumulative pressure differential between ambient conditions and the hollow filler element 90.

In some embodiments, the filler element 90 has a rounded triangular cross-section, which allows for better conformity of the braided tow fabric 88 at the transition from the body section 66 to the stiffener 84, where the braided tow fabric 88 comes out of plane from the outboard surface 86 of the body section 66. Further, to accomplish a smooth transition of the braided tow fabric 88 from the body section 66 to form the stiffener 84, axial tows 80 of the braided tow fabric 88 are discontinuous, as shown in FIG. 4, to allow for bias tows 82A, 82B to deform locally and conform to the filler element 90 or flyaway mandrel in forming the stiffener 84. To accomplish this, in some embodiments the axial tows 80 are severed or cut at preselected intervals.

The fan containment case 60 including stiffener 84 as disclosed herein allows for a thin-walled, structural, hard-wall braided composite fan containment case 60 with integral stiffeners 84 that resists ovalization and potential associated effects on fan blade clearances (efficiency). The configurations could also be used to mitigate the potential for fan blade coincidence (harmonic interaction between the fan blades and fan containment case). The configurations disclosed herein eliminate the need for secondarily bonded stiffeners or mechanically fastened features that provide an increase in the fan containment case 60 stiffness. This simplifies the design, reduces the number of components, and potentially provides weight reduction relative to other equivalent design solutions.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine component, comprising:
  a tubular body section including a plurality of fiber wraps encompassed within a matrix composition; and
  one or more integrally-formed stiffeners extending from an outer surface of the body section and in a component circumferential direction around the body section, the stiffener including one or more fiber wraps of the plurality of fiber wraps of the body section extending radially outwardly from the body section over a form and to the body section from the form;

wherein the form is hollow; and wherein one or more vent openings extend into the form to reduce a pressure differential between ambient conditions and an interior of the form;

wherein the plurality of fiber wraps each include:
  a plurality of axial tows oriented to extend in the component circumferential direction; and
  a plurality of first bias tows and a plurality of second bias tows braided with the plurality of axial tows; and wherein:
  the stiffener extends continuously and unbroken around an entire circumference of the tubular body section; and
  the plurality of axial tows of the one or more fiber wraps of the plurality of fiber wraps are discontinuous at the stiffener to allow for conformity of the plurality of first bias tows and the plurality of second bias tows to the form;

wherein the body section includes:
  a main portion having a first radial thickness; and
  an axially forward portion disposed axially forward of the main portion and having a second radial thickness less than the first radial thickness; and
  an axially aft portion disposed axially aft of the min portion and having a third radial thickness less than the first radial thickness;

wherein a stiffener of the one or more stiffeners extends from an outer surface of one of the axially forward portion or the axially aft portion, axially spaced apart from the main portion;

wherein the stiffener has a rounded triangular cross-section including:
  a linear base portion;
  two linear legs extending from the base portion; and
  a peak portion connecting the two linear legs, the peak portion a continuous arc.

2. The gas turbine engine component of claim 1, wherein the form is one of a flyaway mandrel or a filler element.

3. The gas turbine engine component of claim 2, wherein the filler element is formed from one of a potting compound or a foam material.

4. A fan containment case for a gas turbine engine, comprising:
  a tubular body section including a plurality of fiber wraps encompassed within a matrix composition, the plurality of fiber wraps each including:
    a plurality of axial tows oriented to extend in the component circumferential direction; and
    a plurality of first bias tows and a plurality of second bias tows braided with the plurality of axial tows; and
  one or more integrally-formed stiffeners extending from an outer surface of the body section and in a component circumferential direction around the body section, the stiffener including one or more fiber wraps of the plurality of fiber wraps of the body section extending radially outwardly from the body section over a filler element and to the body section from the filler element;

wherein the filler element is hollow;

wherein one or more vent openings extend into the filler element to reduce a pressure differential between ambient conditions and an interior of the filler element; and wherein:
  the stiffener extends continuously and unbroken around an entire circumference of the tubular body section; and
  the plurality of axial tows of the one or more fiber wraps of the plurality of fiber wraps are discontinuous at the stiffener to allow for conformity of the plurality of first bias tows and the plurality of second bias tows to the form;

wherein the body section includes:
  a main portion having a first radial thickness; and
  an axially forward portion disposed axially forward of the main portion and having a second radial thickness less than the first radial thickness; and
  an axially aft portion disposed axially aft of the min portion and having a third radial thickness less than the first radial thickness;

wherein a stiffener of the one or more stiffeners extends from an outer surface of one of the axially forward portion or the axially aft portion, axially spaced apart from the main portion;

wherein the stiffener has a rounded triangular cross-section including:
  a linear base portion;
  two linear legs extending from the base portion; and
  a peak portion connecting the two linear legs, the peak portion a continuous arc.

5. The fan containment case of claim 4, wherein the filler element is formed from one of a potting compound or a foam material.

6. A gas turbine engine, comprising:
  a turbine section; and
  a fan section operably connected to the turbine section, including:
    a fan; and
    a fan containment case surrounding the fan, the fan containment case including:
      a tubular body section including a plurality of fiber wraps encompassed within a matrix composition, the plurality of fiber wraps each including:
        a plurality of axial tows oriented to extend in the component circumferential direction; and
        a plurality of first bias tows and a plurality of second bias tows braided with the plurality of axial tows; and
      one or more integrally-formed stiffeners extending from an outer surface of the body section and in a component circumferential direction around the body section, the stiffener including one or more fiber wraps of the plurality of fiber wraps of the body section extending radially outwardly from the body section over a filler element and to the body section from the filler element;

wherein the filler element is hollow; and wherein one or more vent openings extend into the filler element to reduce a pressure differential between ambient conditions and an interior of the filler element; and wherein:
  the stiffener extends continuously and unbroken around an entire circumference of the tubular body section; and
  the plurality of axial tows of the one or more fiber wraps of the plurality of fiber wraps are discontinuous at the stiffener to allow for conformity of the plurality of first bias tows and the plurality of second bias tows to the form;
wherein the body section includes:
a main portion having a first radial thickness; and
an axially forward portion disposed axially forward of the main portion and having a second radial thickness less than the first radial thickness; and
an axially aft portion disposed axially aft of the min portion and having a third radial thickness less than the first radial thickness;
wherein a stiffener of the one or more stiffeners extends from an outer surface of one of the axially forward portion or the axially aft portion, axially spaced apart from the main portion;
wherein the stiffener has a rounded triangular cross-section including:
a linear base portion;
two linear legs extending from the base portion; and
a peak portion connecting the two linear legs, the peak portion a continuous arc.

7. The gas turbine engine of claim 6, wherein the filler element is formed from one of a potting compound or a foam material.

* * * * *